Figure 1:
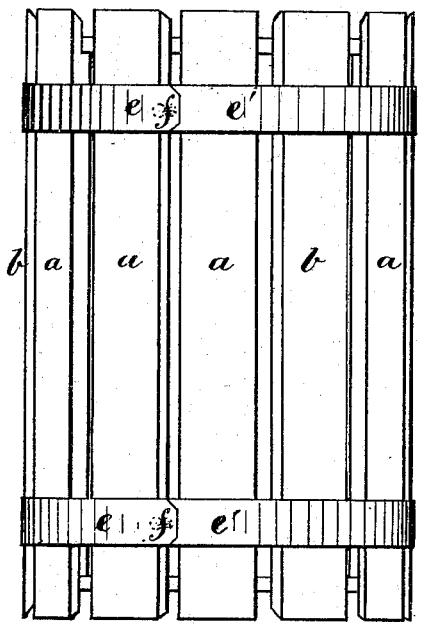

L. W. FLYE & C. H. WATSON.
BARRELS.

No. 170,162. Patented Nov. 23, 1875.

Witnesses:
John R. Heard.
F. Allen.

Inventors:
L. W. Flye and C. H. Watson
by Alban Andren
their atty

UNITED STATES PATENT OFFICE.

LUTHER W. FLYE AND CHARLES H. WATSON, OF BOSTON, MASSACHUSETTS, ASSIGNORS OF ONE-THIRD THEIR RIGHT TO EDWARD WEBB, OF NEW CASTLE, MAINE.

IMPROVEMENT IN BARRELS.

Specification forming part of Letters Patent No. 170,162, dated November 23, 1875; application filed May 8, 1875.

*To all whom it may concern:*

Be it known that we, LUTHER W. FLYE and CHARLES H. WATSON, of Boston, in the county of Suffolk and State of Massachusetts, have jointly invented certain new and useful Improvements in Barrels; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our invention relates to improvements in barrels for the transportation of fruits or vegetables, or similar substances; and the object we have in view is twofold—first, to provide a barrel with sufficient air-spaces all round its circumference, so as to insure a perfect ventilation through the fruit or vegetables contained in the barrel, by which arrangement fruit and vegetables transported in such a ventilated barrel can be transported long distances without signs of decay; and, secondly, in so constructing a ventilated barrel that it may be taken apart on arriving at its destination and packed in a small compass and returned to the producer, thereby saving a great deal in freight, and dispensing with a new set of barrels for each lot of fruit. This we accomplish by attaching the staves to metallic hoops in such a manner that an open space is left between every stave. The ends of the hoops are locked together by means of a pin in one end of the hoop projecting through a hole in the following end of the hoop, or in a similar and equivalent manner, and we wish distinctly to state that we do not attach any importance to the locking device between the metallic hoops. The ends of the staves are provided with grooves on the inside; but all the staves are not made in this manner, as every other one, more or less in number, is provided with only a shoulder for the head to rest against. The heads are provided on their circumference with a number of recesses equal in number to the staves having grooves in their ends, by which arrangement the heads can be attached to the staves after the hoops are locked together, simply by inserting the head within the staves, so that each recess on the head comes opposite each grooved stave, after which the head is attached to the barrel by merely turning it a short distance around its center. When it is desired to take the barrel apart each head is turned around its center, so that each recess thereon comes opposite to the staves having grooves, when the head can easily be removed from the staves, after which the hoops are unlocked from each other, and the whole barrel can then be packed in a very small space as compared to its original size.

Figure 3:
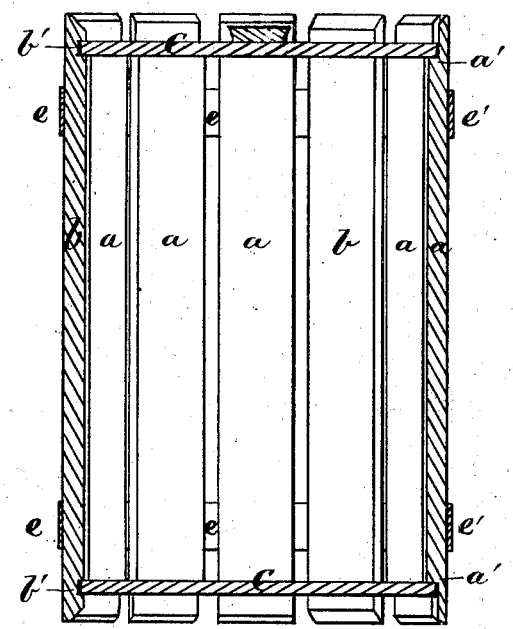
Figure 4:
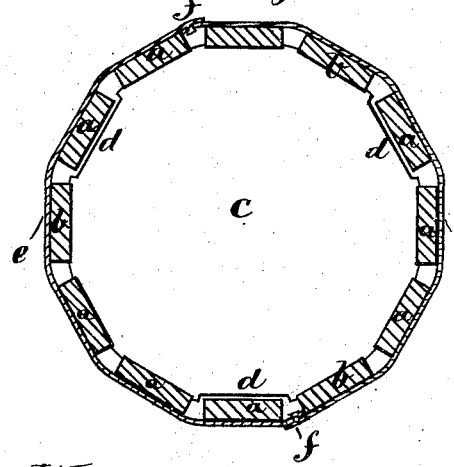
Figure 2:
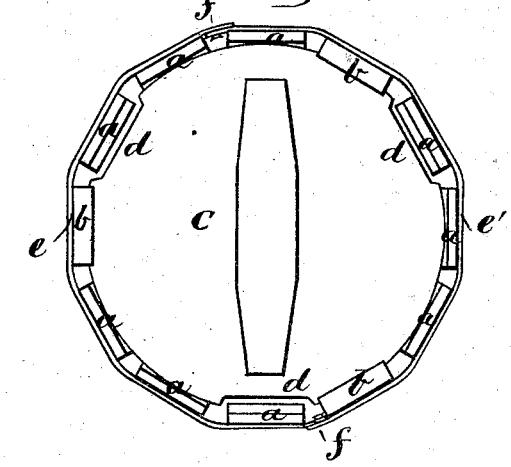

On the accompanying drawings, Figure 1 represents a side elevation of our improved barrel. Fig. 2 represents a ground plan. Fig. 3 represents a center longitudinal section, and Fig. 4 represents a cross-section of the same.

Similar letters refer to similar parts wherever they occur on the drawings.

$a\ a\ b\ b$ represent the staves, and $c\ c$ represent the heads. The staves $b\ b$ are the locking-staves, for which purpose they are provided in each end with an inside groove, $b'\ b'$, as shown in Fig. 3. The staves $a\ a\ a$ are not grooved, but provided with only a shoulder, $a'\ a'\ a'$, for the head $c$ to rest against. Each head $c\ c$ is provided with recesses $d\ d\ d$, more or less, of a number equal to the number of the staves $b\ b\ b$, that are provided with the inside grooves $b'\ b'\ b'$. The staves $a\ a\ b\ b$ are attached, by rivets, screws, or similar means, to the semicircular metallic hoops $e\ e\ e'\ e'$, that are joined together at $f\ f$ in such a manner that the staves attached to the hoops $e\ e$ can be disconnected from the staves attached to the hoops $e'\ e'$ when the barrel is to be taken apart for transportation.

Having thus fully described the nature, construction, and operation of our invention, we wish to secure by Letters Patent, and claim—

The improved ventilated fruit-barrel, as herein shown and described, consisting of the heads $c\ c$, with their recesses $d\ d\ d$, grooved staves $b\ b\ b$, and staves $a\ a\ a$, attached to the hoops $e\ e\ e'\ e'$, as and for the purpose set forth.

In testimony that we claim the foregoing as our own invention, we have affixed our signatures in presence of two witnesses.

LUTHER W. FLYE.
CHARLES H. WATSON.

Witnesses:
ALBAN ANDRÉN,
JOHN R. HEARD.